(12) United States Patent
Takagi et al.

(10) Patent No.: US 6,746,757 B1
(45) Date of Patent: Jun. 8, 2004

(54) MULTILAYERED MOLDING

(75) Inventors: Kiyoji Takagi, Hiratsuka (JP); Akihiro Kokubo, Hiratsuka (JP); Koji Nishida, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 09/505,468

(22) Filed: Feb. 16, 2000

Related U.S. Application Data

(63) Continuation-in-part of application No. 09/207,709, filed on Dec. 9, 1998, now abandoned.

(30) Foreign Application Priority Data

Dec. 9, 1997 (JP) ............................................. 9-354027

(51) Int. Cl.⁷ ................................................ B32B 7/02
(52) U.S. Cl. ..................... 428/213; 428/220; 428/411.1; 428/412; 428/475.8; 428/476.1; 428/476.3; 428/476.9; 428/483; 428/516; 428/517; 428/520
(58) Field of Search ................................ 428/213, 220, 428/411.1, 412, 475.8, 476.1, 476.3, 476.9, 483, 516, 517, 520, 426.3

(56) References Cited

U.S. PATENT DOCUMENTS

| | | | |
|---|---|---|---|
| 3,953,086 A | 4/1976 | Chaffin | 308/3 A |
| 4,567,089 A | 1/1986 | Hattori et al. | 428/213 |
| 4,572,854 A | 2/1986 | Dallmann et al. | 428/35 |
| 4,842,951 A | 6/1989 | Yamada et al. | 428/516 |
| 4,914,152 A | 4/1990 | Miyashita et al. | 525/68 |
| 5,310,584 A | 5/1994 | Jacoby et al. | 428/2 |
| 5,314,733 A | 5/1994 | Saito et al. | 428/36.6 |
| 5,348,804 A | 9/1994 | Vasselin et al. | 428/423.1 |
| 5,534,372 A | 7/1996 | Koshizuka et al. | 430/10 |
| 5,648,424 A | 7/1997 | Miwa et al. | 525/92 |
| 5,717,014 A | 2/1998 | Ohkawachi et al. | 514/118 |

*Primary Examiner*—D. S. Nakarani
(74) *Attorney, Agent, or Firm*—Edwards & Angell, LLP; David G. Conlin; Lisa Swiszcz Hazzard

(57) ABSTRACT

The present invention relates to a multilayered molding comprising at least two of a layer A and a layer B, in which the layers A are formed on both sides of the layer B, each layer A comprises a same or different thermoplastic resin compositions, the layer A has a flexural modulus according to ASTM D790 of not less than 5,000 kg/cm², the layer B comprises a thermoplastic resin composition and has a flexural modulus according to ASTM D790 of not more than 5,000 kg/cm², and the ratio of flexular modulus of the layer A to flexural modulus of the layer B is not less than 5.

6 Claims, No Drawings

MULTILAYERED MOLDING

CROSS REFERENCE TO RELATED APPLICATION

This is a continuation-in-part of application Ser. No. 09/207,709, filed Dec. 9, 1998 now abandoned.

BACKGROUND OF THE INVENTION

The present invention relates to multilayered moldings. More particularly, it relates to multilayered moldings which comprises thermoplastic resin and have excellent low-temperature impact strength, rigidity, dimensional stability and heat resistance. The multilayered moldings of the present invention are useful for various applications of industrial products, for example, trims (such as bumper) and outside plating (such as fender) of automobiles, housings of electrical and electronic equipment, and building materials such as sound-absorbing walls.

From a view point to attain weight reduction and higher safety of automobiles, many efforts have been made for utilizing the resins in the manufacture of automobile parts such as bumper and fender in place of the conventional metal materials, and the moldings of such resins as polyphenylene ethers, polyamides, polyolefins and polyesters have been partially commercialized by advantages of their excellent qualities such as heat resistance and impact strength.

Nevertheless, it is difficult with the resins to impart the same properties as metals. In the aspect of material, many attempts have been made to blend an impact resistance improver and an inorganic filler in the resin compositions, but these attempts have been unsatisfactory in balance of rigidity and impact strength. In the aspect of molding, researches have been made on the moldings of double-wall structure for realizing improvement of both of rigidity and impact strength, but the obtained moldings are still unsatisfactory in low-temperature impact strength and necessitate designing to a thickness of 8–10 mm in use as a single-layer molding. Thus, such resin moldings cannot be even expected to provide a satisfactory weight-reducing effect as compared with metal materials.

As a result of the present inventors earnest studies to solve the above problem, it has been found that a combination of certain specific kinds of thermoplastic resin composition is effective for providing the useful multilayered moldings having excellent low-temperature impact strength, rigidity, dimensional stability and heat resistance.

The present invention has been attained on the basis of the above finding.

SUMMARY OF THE INVENTION

It is an object of the present invention to provide a multilayered molding having an improved balance of properties such as low-temperature impact resistance and rigidity.

To attain the above aim, in an aspect of the present invention, there is provided a multilayered molding comprising at least two of a layer A and a layer B, in which the layers A are formed on both sides of the layer B, each layer A comprises a same or different thermoplastic resin compositions, the layer A has a flexural modulus according to ASTM D790 of not less than 5,000 kg/cm², the layer B comprises a thermoplastic resin composition and has a flexural modulus according to ASTM D790 of not more than 5,000 kg/cm², and the ratio of flexural modulus of the layer A to flexural modulus of the layer B is not less than 5.

DETAILED DESCRIPTION OF THE INVENTION

A detailed description of the present invention is explained as follow.

First, the layer A is explained.

In the present invention, it is essential that the thermoplastic resin composition constituting the layer A has a flexural modulus (as measured according to ASTM D790) of not less than 5,000 kg/cm², preferably not less than 7,000 kg/cm², more preferably not less than 15,000 kg/cm², even more preferably not less than 30,000 kg/cm².

In the present invention, the flexural modulus is defined as a modulus of elasticity in bending measured by a three-point loading system according to ASTM D790.

Examples of the thermoplastic resins constituting the layer A include polyphenylene ethers, polyamides, polycarbonates, saturated polyesters, polyolefins and polyphenylene sulfides. These are explained more specifically below.

The polyphenylene ethers usable for the layer A have a chemical structure represented by the following formula (I):

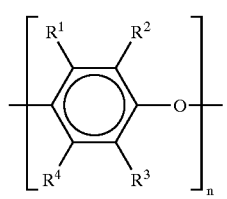

(1)

wherein n is an integer of not less than 50; $R^1$, $R^2$, $R^3$ and $R^4$ represent individually a monovalent substituent selected from the group consisting of hydrogen atom, halogen atom, hydrocarbon groups including no tertiary α-carbon atom, halohydrocarbon groups substituted by halogen atom(s) through at least 2 carbon atoms, hydrocarbonoxy groups, and halohydrocarbonoxy groups substituted by halogen atom(s) through at least 2 carbon atoms.

Examples of the hydrocarbon groups including no tertiary α-carbon atom are lower alkyl groups such as methyl, ethyl, n-propyl, isopropyl, n-butyl and isobutyl; alkenyl groups such as vinyl, allyl, butenyl and cyclobutenyl; aryl groups such as phenyl, tollyl, xylenyl and 2,4,6-trimethylphenyl; and aralkyl groups such as benzyl, phenylethyl and phenylpropyl.

Examples of the halohydrocarbon groups substituted by halogen atom(s) through at least 2 carbon atoms include 2-chloroethyl, 2-bromoethyl, 2-fluoroethyl, 2,2-dichloroethyl, 2- or 3-bromopropyl, 2,2-difluoro-3-iodopropyl, 2-, 3-, 4- or 5-fluoroamyl, 2-chlorovinyl, chloroethylphenyl, ethylchlorophenyl, fluoroxylyl, chloronaphthyl and bromobenzyl.

Examples of the hydrocarbonoxy groups include methoxy, ethoxy, propoxy, butoxy, phenoxy, ethylphenoxy, naphthoxy, methylnaphthoxy, benzyloxy, phenylethoxy and tolylethoxy.

Examples of the halohydrocarbonoxy groups substituted by halogen atom(s) through at least 2 carbon atoms include 2-chloroethoxy, 2-bromoethoxy, 2-fluoroethoxy, 2,2-dibromoethoxy, 2- or 3-bromopropoxy, chloroethylphenoxy, ethylchlorophenoxy, iodoxyloxy, chloronaphthoxy, bromobenzyloxy and chlorotolylethoxy.

The polyphenylene ethers represented by the formula (1) usable for the layer A include the copolymers such as 2,6-dimethylphenol and 2,3,6-trimethylphenol copolymer, 2,6-dimethylphenol and 2,3,5,6-tetramethylphenol copolymer, and 2,6-diethylphenol and 2,3,6-trimethylphenol copolymer. It is also possible to use the so-called modified polyphenylene ethers, e.g. those obtained by graft polymerizing styrene monomers (such as styrene, p-methylstyrene, α-methylstyrene, etc.) to the polyphenylene ethers represented by the formula (1).

These polyphenylene ethers can be produced by the known processes, such as taught in U.S. Pat. Nos. 3,306,874, 3,306,875, 3,257,357 and 3,257,358, Japanese Patent Publication (KOKOKU) No. 52-17880 and Japanese Patent Application Laid-Open (KOKAI) No. 50-51197.

The preferred polyphenylene ethers used in the present invention are those having alkyl substituents at 2 ortho-positions based on the ether/oxygen atom bonds, namely the polyphenylene ethers represented by the formula (1) wherein each of $R^2$ and $R^3$ is an alkyl group. Specifically, homopolymer of 2,6-dialkylphenol or 2,3,6-trialkylphenol, and copolymer of 2,6-dialkylphenol and 2,3,6-trialkylphenol are preferred. Also, the polyphenylene ethers used in the present invention preferably have an intrinsic viscosity of 0.25 to 0.70 dl/g (as measured in chloroform at 30° C.). If the intrinsic viscosity is less than 0.25 dl/g, the produced resin composition may be unsatisfactory in impact strength and heat resistance, and if the intrinsic viscosity exceeds 0.7 dl/g, molding workability of the composition may be deteriorated. A high-viscosity polyphenylene ether and a low-viscosity one may be used in combination for improving molding workability of the resin composition.

The polyamide resins usable for the layer A are the ones having —CONH— bonds to the polymer backbone and fusible by heating. The polyamide resins usually have a 3- or more-membered ring lactam, an ω-amino-acid or a dibasic acid and a diamine as monomer components and can be obtained by ring-opening polymerization or polycondensation. Typical examples of such polyamides are nylon-4, nylon-6, nylon-6.6, nylon-4.6, nylon-12, nylon-6.10, and nylon-11.

Aromatic polyamides including aromatic diamines and aromatic dicarboxylic acids, and the copolymer polyamides including dimerized fatty acids as monomer components are also usable.

The "dimerized fatty acids" referred to herein mean the polybasic polymerized fatty acids obtainable by polymerizing the unsaturated fatty acids, for example, monobasic fatty acids from natural oils or synthetic monobasic fatty acids having 8 to 24 carbon atoms and at least one double or triple bond. Typical examples of such dimerized fatty acids are dimers of linoleic acid and linolic acid. The commercially available polymerized fatty acids are called dimer acids, which usually comprise a dimer as main component and may contain a trimer and/or the starting monomer, but it is preferred that the dimer content is not less than 70% by weight, preferably not less than 95% by weight, more preferably not less than 98% by weight. Of course, the commercially available dimer acids may be distilled to increase the dimer content, or in some cases these may be hydrogenated to lower the degree of unsaturation.

The preferred polyamides used in the present invention are nylon-6.6, nylon-6, nylon-12 and the copolymer polyamides containing the said dimerized fatty acids. These polyamides preferably have a relative viscosity of 2.0 to 8.0 (measured in 98% sulfuric acid at 25° C.).

The polycarbonate resins usable for the layer A are those having —O—CO—O— bonds to the polymer backbone and being fusible by heating. Examples of such polycarbonate resins include aromatic polycarbonates, aliphatic polycarbonates, and aliphatic-aromatic polycarbonates, of which the aromatic polycarbonates obtainable from bisphenols such as 2,2-bis(4-oxyphenyl)alkane type, bis(4-oxyphenyl)ether type, bis(4-oxyphenyl)sulfone type and sulfide or sulfoxide type are preferred. Polycarbonates obtainable from halogen-substituted bisphenols are also usable, if necessary. The molecular weight of the polycarbonates used in the present invention is not specified, but generally it is preferable that their molecular weight is usually not less than 10,000, preferably 20,000 to 40,000.

The saturated polyester resins usable for the layer A are those having —CO—O— bonds to the polymer backbone and being fusible by heating various kinds of polyesters can be used.

For instance, the polyesters obtained by polycondensing a dicarboxylic acid or its lower alkyl ester, an acid halide or acid anhydride derivative with a glycol or a divalent phenol can be used. Examples of the dicarboxylic acids usable for the polycondensation include aliphatic dicarboxylic acids such as oxalic acid, malonic acid, succinic acid, glutaric acid, adipic acid, suberic acid, azelaic acid and sebacic acid; aromatic dicarboxylic acids such as terephthalic acid, isophthalic acid, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, 2,6-naphthalenedicarboxylic acid and 2,7-naphthalenedicarboxylic acid; and mixtures of these carboxylic acids. The glycols usable for the above polycondensation include $C_2$–$C_{12}$ linear-chain alkylene glycols, for example aliphatic glycols such as ethylene glycol, 1,3-propylene glycol, 1,4-butene gylcol, 1,6-hexene glycol and 1,12-dodecamethylene glycol, alicyclic glycols such as 1,4-cyclohexanedimethanol, and aromatic glycols such as p-xylyleneglycol. The divalent phenols also usable for the said polycondensation include pyrocatechol, resorcinol, hydroquinone and alkyl-substituted derivatives of these compounds.

Polyesters obtained from ring-opening polymerization of lactones such as polypivalolactone or poly(ω-caprolactone), and the polyesters which are the polymers forming liquid crystal in a molten state (thermoplastic liquid crystal polymers; TLCP) are also usable. Typical commercial products of such liquid crystal polyesters are X7G of Eastman Kodak Co., Xydar of Dartoko Co., Ltd, Econol of Sumitomo Chemical Co., Ltd., and Vectora of Celanese Corporation.

Preferred saturated polyesters used in the present invention are polyethylene terephthalate (PET), polybutylene terephthalate (PBT), polyethylene naphthalate (PEN), poly(1,4-cyclohexanedimethylene terephthalate (PCT) and the above-mentioned liquid crystal polyesters. These saturated polyesters preferably have an intrinsic viscosity (measured in a 60/40 wt % mixed solution of phenol and 1,1,2,2-tetrachloroethane at 20° C.) of 0.5 to 5.0 dl/g, more preferably 1.0 to 4.0 dl/g, even more preferably 2.0 to 3.5 dl/g. If the intrinsic viscosity of the polyester is less than 0.5 dl/g, the produced resin composition may be poor in impact resistance, and if the intrinsic viscosity exceeds 5.0 dl/g, the composition may be unsatisfactory in moldability.

The polyolefins usable for the layer A include the homopolymers of α-olefins such as ethylene, propylene, butene-1, pentene-1, hexene-1, 3-methylbutene-1, 4-methylpentene-1, heptene-1 and octene-1, random or block copolymers of these α-olefins with each other, random, graft or block copolymers of these α-olefins as a main component with other unsaturated monomers, and these olefin polymers which have been subjected to an oxidation, halogenation, sulfonation or like treatment and show at least partly polyolefin-credited crystallizability, with the degree of crystallinity of these polymers being preferably not less than 20%.

Examples of the other unsaturated monomers usable with the said α-olefins include unsaturated carboxylic acids such as acrylic acid, methacrylic acid, maleic acid, itaconic acid, methyl acrylate, ethyl acrylate, methyl methacrylate, maleic anhydride, arylmaleic acid imide, alkylmaleic acid imide and derivatives thereof; vinyl esters such as vinyl acetate and vinyl butyrate; aromatic vinyl compounds such as styrene and methylstyrene; vinylsilanes such as vinyltrimethylmethoxysilane and γ-methacryloyloxypropyltrimethoxysilane; and nonconjugated dienes such as dicyclopentadiene and 4-ethyldene-2-norbornene. These polyolefins can be obtained by the conventional methods of polymerization or modification. These may also be properly selected from the commercial products.

The preferred polyolefins are the homopolymers of propylene, butene-1,3-methylbutene-1 and 4-methylpentene-1, and the copolymers containing of these monomers as a main component. The crystallizable propylene-based polymers, i.e. crystallizable propylene homopolymers, crystallizable propylene-α-olefin block or random copolymers, and mixtures of these crystallizable propylene-based polymers and α-olefin rubbers, viz. rubber-like copolymers comprising α-olefins or α-olefins and non-conjugated dienes, are especially preferred in respect of balance of the mechanical properties.

The melt flow rate (MFR) (measured at 230° C. under a load of 2.16 kg) of these crystallizable propylene-based polymers or the mixtures thereof with α-olefin rubbers is preferably 0.01 to 250 dg/min, more preferably 0.05 to 150 dg/min, even more preferably 0.1 to 50 dg/min. If MFR is less than 0.01 dg/min, the produced resin composition may be unsatisfactory in molding workability, while if MFR exceeds 250 dg/min, balance of the mechanical properties of the composition tends to deteriorate. In these crystallizable propylene-based polymers usable in the present invention are included those having higher molecular weights and subjected to a heat treatment in the presence of a radical generator such as an organic peroxide to vary the molecular weight so that MFR falls within the above-defined range.

The other thermoplastic resins usable for forming the layer A in the present invention include polyacetal (POM), fluorine resins, polyether ether ketone, polystyrene resins, ABS resins, aromatic polysulfones, aromatic polyether sulfones, silicon resins, polyether imides, poly(alkyl) acrylates and the like.

The preferred thermoplastic resins usable forming the layer A are polyphenylene ethers, polystyrenes, polycarbonates, polybutylene terephthalate, polyamides and polypropylenes, of which polyphenylene ethers, polystyrenes and polycarbonates are more preferred, polyphenylene ethers being especially preferred.

The layer B of the moldings according to the present invention is explained below.

It is essential that the thermoplastic resin composition constituting the layer B has a flexural modulus (measured according to ASTM D790) of not more than 5,000 kg/cm², preferably not more than 3,000 kg/cm², more preferably less than 2,000 kg/cm², still more preferably not more than 1,000 kg/cm².

The thermoplastic resins usable for forming the layer B in the present invention include aromatic vinyl compound-conjugated diene block copolymers, polyolefin copolymers, polyamide elastomers, soft polyamides, polyester elastomers, silicone elastomers, and core-shell type elastomers. These resins are explained more specifically below.

The aromatic vinyl compound-conjugated diene block copolymers usable for the layer B are the block copolymers or the hydrogenated products thereof (hereinafter referred to as hydrogenated block copolymers) having a structure in which at least one chain block derived from an aromatic vinyl compound and at least one chain block derived from a conjugated diene are bonded to the polymer backbone. The "hydrogenated block copolymers" are the block copolymers in which aliphatic unsaturated bonds in the chain block derived from a conjugated diene were decreased by hydrogenation. As for the arrangement of both chain blocks, these are preferably of a linear configuration, more preferably of a diblock configuration. The block copolymers may contain a branched structure (radical terblocks) if small in amount. These may also contain a random chain derived from random copolymerization of an aromatic vinyl compound and a conjugated diene at a part of the polymer backbone.

The preferred aromatic vinyl compounds used in the present invention are styrene, α-methylstyrene, paramethylstyrene, vinyltoluene and vinylxylene, styrene being more preferred. As the conjugated diene compound, 1,3-butadiene or 2-methyl-1,3-butadiene is preferably used.

The preferred aromatic vinyl compound-conjugated diene block copolymers are the said hydrogenated block copolymers in which the percentage of the repeating units derived from the aromatic vinyl compound is preferably 10 to 80% by weight, more preferably 15 to 60% by weight. Also, in the hydrogenated block copolymer, the percentage of the non-hydrogenated portion of the aliphatic unsaturated bonds in the chain block derived from a conjugated diene is preferably not more than 20%, more preferably not more than 10%. As for the aromatic unsaturated bonds derived from an aromatic vinyl compound, not more than about 25% thereof may be hydrogenated.

As a measure of the molecular weight of the hydrogenated block copolymer, it is selected such that the viscosity of a toluene solution (15 wt % conc.) of the copolymer at 25° C. is preferably 30,000 to 10 cps, more preferably 10,000 to 30 cps. When the viscosity is more than 30,000 cps, the final product composition may be poor in molding workability, and when the viscosity is less than 10 cps, mechanical strength of the final composition may lower.

The polyolefin-based copolymers usable for the layer B are the rubber-like copolymers comprising α-olefins or α-olefins and a non-conjugated diene, and showing almost no crystallizability, with their degree of crystallinity being 0 to 20%. A vanadium-based catalyst or a metallocene catalyst can be used for the copolymerization. The copolymer density is preferably not more than 0.94 g/cm³, more preferably 0.80 to 0.94 g/cm³, even more preferably 0.85 to 0.88 g/cm³. MFR of these copolymers measured at 190° C. under a load of 2.16 kg is preferably 0.001 to 5 dg/min, more preferably 0.01 to 2 dg/min, even more preferably 0.1 to 1 dg/min.

A process of producing a polyolefin-based copolymer using a vanadium-based catalyst comprises copolymerizing α-olefins using a vanadium-based catalyst comprising a vanadium compound such as vanadium chloride or vanadium oxychloride and an organic aluminum compound such as triethylaluminum sesquichloride. The polyolefin-based copolymer rubbers produced according to this catalyst system usually have good randamizability.

Examples of these polyolefin-based copolymers include ethylene-propylene copolymer, ethylene-propylene-butene copolymer, ethylene-butene copolymer, propylene-4-methylpentene-1 copolymer, ethylene-hexene copolymer and ethylene-octene copolymer. The preferred polyolefin-based copolymers are ethylene-propylene copolymer rubber and ethylene-butene copolymer rubber, which are the amorphous random copolymers produced by copolymerizing ethylene and propylene, or ethylene and butene, optionally using a non-conjugated diene as the third component. As the non-conjugated diene, dichloropentadiene, 1,4-hexadiene, cyclooctadiene, methylnorbornene, 5-ethylidene-2-norbornene and the like can be used.

For producing the polyolefin-based copolymers using a metallocene catalyst, it is preferred to use the method disclosed in Japanese Patent Application Laid-Open (KOKAI) Nos. 58-19309, 59-95292, 60-35005, 60-35006, 60-35007, 60-35008, 60-35009, 61-130314 and 3-163088, European Patent Application Laid-Open No. 420,436, U.S. Pat. No. 5,055,438 and WO 91/04257, namely the method which comprises copolymerizing ethylene (used as main component) and α-olefins (used as sub-components) using a metallocene catalyst, especially a metallocene-alumoxane catalyst or a catalyst comprising a metallocene compound such as disclosed in WO 92/01723 and a compound which becomes a stable anion on being reacted with a metallocene compound such as exemplified below.

Examples of such metallocene compounds include the compounds represented by the following formula (2):

$$ML_x \quad (2)$$

wherein M is a transition metal selected from the group consisting of Zr, Ta, Hf, V, Ni, Ti and Cr; L represents ligands coordinate to the transition metal, with at least one L representing a ligand having a cyclopentadienyl skeleton and other L's representing a $C_1$–$C_{12}$ hydrocarbon group, an alkoxy group, an aryloxy group, a trialkylsilyl group or a $SO_4R$ group (wherein R is a $C_1$–$C_8$ hydrocarbon group substituted or non-substituted with a halogen, etc.), a halogen atom or a hydrogen atom; and x is the number of the ligands.

The compounds which are reacted with the said metallocene compounds to become the stable anions, are the ionic compounds formed from the ion pairs of cations and anions or the electrophilic compounds. Further, the compound are reacted with the metallocene compounds to become the stable ions which serve as an active species for polymerization. Of these compounds, the ionic compounds are represented by the following formula (3):

$$[Q]_p[Y]_q \quad (3)$$

(p and q are an integer of 1 or more, respectively)

In the above formula, Q is the cation moiety of the ionic compounds, such as carbonium cation, tribilium cation, ammonium cation, oxonium cation, sulfonium cation, phosphonium cation, etc. It may be a cation of a metal which itself is liable to reduction or a cation of an organic metal. Y is the anion moiety of the ionic compounds. It is a component which becomes a stable anion on reaction with a metallocene compound, for example, an anion of an organic boron compound, an anion of an organoaluminum compound or an anion of an organic gallium compound.

More specific examples of such component are tetraphenylboron, tetrakis(3,4,5-trifluorophenyl)boron, tetrakis[3,5-di(trifluoromethyl)phenyl]boron, tetrakis[3,5-di(t-butyl)phenyl]boron, tetrakis(pentafluorophenyl)boron, tetraphenylaluminum, tetrakis(3,4,5-trifluorophenyl)aluminum, tetrakis[3,5-di(trifluoromethyl)phenyl]aluminum, tetrakis[3,5-di(t-butyl)phenyl]aluminum, tetrakis(pentafluorophenyl)aluminum, tetraphenylgallium, tetrakis(3,4,5-trifluorophenyl)gallium, tetrakis[3,5-di(trifluoromethyl)phenyl]gallium, tetrakis[3,5-di(t-butyl)phenyl]gallium, tetrakis(pentafluorophenyl)gallium, tetraphenylphosphorus, tetrakis(pentafluorophenyl)phosphorus, tetraphenylarsenic, tetrakis(pentafluorophenyl)arsenic, tetraphenylantimony, tetrakis(pentafluorophenyl)antimony, decaborate, undecaborate, carbadodecaborate, and decachlorodecaborate.

As the α-olefin serving as sub-component in the preparation of the said polyolefin-based copolymer, there can be used the $C_4$–$C_{40}$ α-olefins such as butene-1, pentene-1, hexene-1, 4-methylpentene-1, heptene-1, 4-methylhexene-1, 4,4-dimethylpentene-1, octene-1 and octadecene-1. The polyolefin-based copolymer is preferably the one obtained by copolymerizing 2 to 60%, preferably 5 to 50% by weight of one or more α-olefins having preferably 4 to 20 carbon atoms, more preferably 4 to 14 carbon atoms, especially preferably 6 to 10 carbon atoms, and 40 to 98%, preferably 50 to 95% by weight of ethylene.

The Q value of the said polyolefin-based copolymer as determined by size exclusion chromatography (SEC) is preferably not more than 3, more preferably not more than 2.8, even more preferably not more than 2.5.

As the soft polyamide and polyamide elastomer used for the layer B, there can be mentioned, for example, nylon 11-based polymers and nylon 12-based polymers. The nylon 11-based polymers can be produced from 11-aminoundecanoic acid or its ω-lactam and are commercially available under the trade name Rilusan from Toray Industries, Inc. The nylon 12-based polymers can be produced from 12-aminododecanoic acid or its ω-laurolactam and are also commercially available under the trade names of Diamide from Daicel Hulus Co., Ltd., and Grylamide from Ems Japan Co., Ltd.

The thermoplastic resin used for constituting the layer B may be the one obtained by graft-polymerizing an α,β-unsaturated dicarboxylic acid such as maleic acid, maleic acid monomethyl ester, maleic anhydride, itaconic acid, itaconic acid monomethyl ester, itaconic anhydride, fumalic acid or the like; an alicyclic carboxylic acid such as endobicyclo[2,2,11]-5-heptene-2,3-dicarboxylic acid or a derivative thereof; and a compound having a glycidyl group and a (meth)acrylate group in the same molecule, a compound having a A glycidyloxy group and an acrylamide group in the same molecule, an unsaturated monomer having an alicyclic epoxy group, or an epoxy-containing compound such as butylglycidyl maleate, to the said copolymer or elastomer by use of a peroxide, ionizing radiation, ultraviolet rays or other means. The compositional concentration of the above thermoplastic resin is 0.01 to 5.0 wt %, and its modification degree is preferably 0.01 to 5 wt %, more preferably 0.03 to 1.5 wt %, even more preferably 0.05 to 1.0 wt %.

It is preferred that the two layers A and B of the thermoplastic resin compositions used in the present invention have adhesiveness to each other. Such adhesiveness can be improved by, for instance, changing the interfacial characteristics of the disperse phase by chemical means such as the grafting or blocking reactions, or by physical means, and/or increasing the degree of dispersion of the resin.

The adhesive strength between the layers A and B is preferably 1 to 100 kg/cm, more preferably 2 to 50 kg/cm, even more preferably 5 to 30 kg/cm in terms of peel strength measured according to JIS 6744.

The thermoplastic resin composition constituting the layers A and B may comprise two or more different types of thermoplastic resin and may contain other additive components. For example, various types of commonly used additives such as antioxidant, weathering resistance improver, nucleating agent, flame retardant, plasticizer, fluidity improver, releasability improver, impact strength improver, compatibilizing agent (compatibility improver of two or more types of resin), etc., may be contained as additive components within limits not prejudicial to the effect of the present invention. Addition of organic or inorganic filler and other reinforcing agents, especially glass fiber, mica, talc, wollastonite, potassium titanate, calcium carbonate, silica, etc., is effective for improving the qualities of the composition such as rigidity, heat resistance and dimensional precision. Further, in order to enhance practical utility, various known types of colorant and their dispersants may be used within limits not prejudicial to the effect of the invention.

In the present invention, the various mixing methods commonly used for the thermoplastic resins in the art can be used as melting and mixing means for obtaining the objective thermoplastic resin composition. For example, according to the process of the present invention, the powdery or granular component substances are uniformly mixed, if necessary together with the additives such as mentioned above, by a preferable mixing means such as Henschel mixer, ribbon blender or V-type blender, and the mixture is further kneaded by a single- or multiple-screw extruder, rolls, Banbury mixer or the like.

As for the order of kneading, the whole components may be kneaded at the same time or a pertinent blend may be prepared first and then it may be kneaded. Also, the components may be fed successively from a halfway point in the extruder. Further, an organic solvent may be added, and the system may be deaerated from a vent at a halfway point.

The structure of the multilayered moldings according to the present invention comprises a combination of at least two of layer A and layer B, and the ratio of flexural modulus of the layer A to that of the layer B in the resin composition (A/B) is required to be not less than 5:1, preferably 5:1 to 80:1, more preferably 10:1 to 50:1. When this ratio is less than 5, the moldings may be unsatisfactory in impact resistance, especially low-temperature impact resistance. In case where the structure has a plural number of layers A and/or layers B and they are different in modulus from each other, it is preferred to make arrangement such that the ratio of the minimum of modulus of the layers A to the maximum of modulus of the layers B satisfies the above requirement.

As for the layer constitution, it is preferable that the outermost layer is the layer A, and that the layers A are formed on both sides of each layer B, with these layers A comprising a same or different thermoplastic resin compositions. Thus, a layer A/layer B/layer A three-layer structure is the most basic layer constitution. It is of course possible to adopt a layer A (outer layer)/layer B (inner layer) two-layer structure or a 4-layer or more layered structure having an additional layer(s) A and/or layer(s) B to the basic three-layer structure.

The overall thickness of the multilayered moldings, although variable depending on the shape of the moldings, is usually 0.3 to 10 mm, preferably 0.4 to 8 mm, more preferably 0.5 to 7 mm. The total thickness of layer(s) A is usually 50 to 99.5%, preferably 60 to 99.2%, more preferably 70 to 99% based on the total thickness of the multilayered molding. The total thickness of layer B is usually 0.5 to 50%, preferably 0.8 to 40%, more preferably 1 to 30% based on the total thickness of the multilayered molding.

For producing the multilayered moldings according to the present invention, the various molding methods generally applied to the thermoplastic resins, such as injection molding, extrusion molding, press molding, blow molding, rotational molding, vacuum forming for laminated sheets, etc., can be used. Injection molding includes multilayer injection molding and sandwich molding, and extrusion molding includes blow molding by coextrusion method, and extrusion sheet forming. It is also possible to apply a combination of the plural molding methods, such as conducting injection molding on a vacuum formed product of an extruded sheet to obtain a multilayered molding. In rotational molding, shaping and multiplication of layers can be effected by first supplying a resin which is to form the outermost layer, melting and shaping the resin, and then successively supplying the resins which are to form the succeeding inner layers.

According to the present invention, it is possible to obtain the multilayered moldings having excellent low-temperature impact strength, rigidity and dimensional stability by combining the two different thermoplastic resin compositions each having a specific modulus and a specific ratio of modulus of the component layers. These multilayered moldings can be used widely and can offer many industrially useful materials.

EXAMPLES

The present invention is further illustrated by showing the examples thereof, but these examples, however, are merely intended to be illustrative and not to be construed as limiting the scope of the invention.

The abbreviations and the substance of the components used in the following Examples and Comparative Examples are as described below.

The Thermoplastic Resin Composition for Layer A
(1) Polyphenylene Ether Resin
   PPE: poly(2,6-dimethyl-1,4-phenylene) ether (intrinsic viscosity ($\eta$) measured in 30° C. chloroform=0.45 dl/g)
(2) Polyamide Resins
   PA6: nylon 6 (trade name: MC164, produced by Kanebo Co., Ltd.; $\eta$=6.8)
   PA: nylon 6 (trade name: Novamide 1040, produced by Mitsubishi Engineering-Plastics Corporation; $\eta$32 5.5)
   mPA: polyolefin-based elastomer-modified nylon 6 (Novamide ST145, produced by Mitsubishi Engineering-Plastics Corporation)
(3) Polycarbonate Resin
   PC: 2,2-bis(4-oxyphenyl)propane-based polycarbonate (trade name: IUPIRON S2000, produced by Mitsubishi Gas Chemical Co., Ltd.; viscosity-average molecular weight=$2.5 \times 10^4$)
(4) Polystyrene Resin
   PSt: (trade name: HF77, produced by Mitsubishi Chemical Corporation)
(5) Polypropylene Resin
   PP: (trade name: Novatec TA8, produced by Japan Polychem Co., Ltd.)

Additives
(1) Impact Strength Improvers
   SBS: aromatic vinyl compound-conjugated diene block copolymer (trade name: G1651, produced by Shell Chemical Co., Ltd.)
   mEPR: modified ethylene-propylene copolymer elastomer (trade name: IR7741P, produced by JSR, Ltd.)

(2) Compatibilizing Agent
    MA: maleic anhydride (reagent grade)
(3) Inorganic Filler
    Talc (trade name: KT300, produced by Fuji Talc Co., Ltd.)

Thermoplastic Resin Composition for Layer B
(1) Polyolefin-based Copolymers
    PE: ethylene-octene copolymer (trade name: Engage EG8180, produced by Du Pont Dow Elastomer Co., Ltd.; density=0.863; MFR=0.51 dg/min)
    mPE: modified ethylene-octene copolymer, obtained by graft modifying the above copolymer (PE) with maleic anhydride (maleic anhydride concentration=0.8 wt %)
(2) Aromatic Vinyl Compound-conjugated Diene Block Copolymers
    SEBS: hydrogenated product of an ethylene-butadiene-styrene block copolymer (trade name: Toughtec H1041, produced by Asahi Chemical Co., Ltd.; styrene units=30 wt %; hydrogenation rate=99%; viscosity of 15 wt % toluene solution=250 cps; MFR (230° C., 2.16 kg)=5 dg/min
    MSEBS: hydrogenated product of maleic anhydride-modified styrene-butadiene-styrene block copolymer (trade name: Toughtec M1913, produced by Asahi Chemical Co., Ltd.; styrene units=30 wt %; hydrogenation rate=99%; viscosity of 15 wt % toluene solution=250 cps; MFR (230° C., 2.16 kg)=5 dg/min
(3) Soft Polyamide
    PA12: nylon 12-based copolymer (trade name: Novamide L25BTX12A, produced by Mitsubishi Engineering-Plastics Corporation)

Examples 1–8

Preparation of Layer A Resin Composition

The above-shown component materials were mixed at the percentages shown in Tables 1 and 2 and stirred well by a supermixer, and the mixture was melted and kneaded by TEX Twin-Screw Extruder mfd. by Nippon Steel Works, Ltd. (L/D=30, vented) at a setting temperature of 250° C., a screw speed of 290 rpm and a production rate of 40 kg/hr, then extruded into a strand and further cut into pellets. The pellets were dried using a box-type dryer (mfd. by Matsui Seisakusho KK) under nitrogen atmosphere at 110° C. for 12 hours to obtain the resin compositions for the layer A.

Preparation of Layer B Resin Composition

In Examples 1, 4, 6 and 7, the prescribed components were mixed at the percentages shown in Tables 1 and 2 and stirred well by a supermixer to obtain the resin compositions for the layer B.

Production of Multilayered Moldings

The layer A resin composition was supplied to the main extruder of a 3-component-3-layer inside-die laminating type hollow molding machine NB60G (trade name, mfd. by Nippon Steel Works, Ltd.; screw diameter=65 mm) while supplying the layer B resin composition to the side extruder 1 (screw diameter=40 mm) and also supplying the layer A resin composition to another side extruder 2 of the same size. The supplied compositions, maintained at 240° C., 200° C. and 240° C., respectively, were further supplied to a single set of die and coextruded into a parison of a three-layer structure.

This 3-layer structure parison was blow molded under a blowing pressure of 6 kg/cm$^2$G and then, by using a mold (top plate type) set at 80° C., molded into a box-like molding having a double-wall structure with external dimensions of 1,000 mm×800 mm×20 mm (cooling time=5 min).

The layer constitution and layer thickness in each Example were as shown in Tables 1 and 2. In this column, the external layer, intermediate layer and inner layer are represented in that order from top of the column.

Comparative Examples 1–3

The same procedure as defined in Example 6 was conducted except that modified nylon, unmodified nylon and propylene were used respectively as the intermediate layer, and that the layer thickness was changed as shown in Table 2 to obtain the multilayered moldings.

Comparative Example 4

The same procedure as defined in Example 6 was conducted except that the layer constitution was composed of the layer A alone, and that the layer thickness was changed as shown in table 2 to obtain a multilayered molding.
(Evaluation Tests)

The property values and characteristics of the moldings of the Examples and Comparative Examples were determined by the following methods. The results are shown in Tables 1 and 2.
(1) Low-temperature Impact Strength A 100×100 mm test piece was cut out from the middle part of each molding and subjected to a high-speed impact test at −40° C. according to ASTM D3763. In the impact test, the degree of scattering and separation was visually observed. Test was conducted on 10 samples of each molding. Judgment was made according to the following criterion.

⊚: No scattering and separation was observed in any of the 10 samples.

○: Scattering and separation was observed in 1 to 2 samples.

Δ: Scattering and separation was observed in 3 to 4 samples.

X: Scattering and separation was observed in 5 to 9 samples.

XX: Scattering and separation was observed in all of the 10 samples.

(2) Rigidity
A 100×25 mm test piece was cut out in the direction of injection from the middle part of each molding and subjected to a bending test at 23° C. according to ASTM D790-84.
(3) Coefficient of Linear Expansion
A 50×15 mm test piece was cut out in the direction of injection from the middle part of each molding and its coefficient of linear expansion was determined. The test was conducted according to ASTM D696.

TABLE 1

|  | Ex. 1 | Ex. 2 | Ex. 3 | Ex. 4 | Ex. 5 | Ex. 6 |
|---|---|---|---|---|---|---|
| Layer A1 |  |  |  |  |  |  |
| PPE |  |  | 50 |  |  | 40 |
| PA6 | 100 |  |  |  | 100 | 60 |
| PC |  | 100 |  |  |  |  |
| Pst |  |  | 50 |  |  |  |

TABLE 1-continued

|  | Ex. 1 | Ex. 2 | Ex. 3 | Ex. 4 | Ex. 5 | Ex. 6 |
|---|---|---|---|---|---|---|
| PP |  |  |  |  | 80 |  |
| SBS |  |  |  |  |  | 5 |
| mEPR |  |  |  |  | 10 | 5 |
| MA |  |  |  |  |  | 0.5 |
| Talc |  |  |  |  | 20 | 18 |
| Layer A2 |  |  |  |  |  |  |
| PPE |  |  |  |  | 50 |  |
| PA |  |  |  |  |  |  |
| mPA |  |  |  |  |  |  |
| Pst |  |  |  |  | 50 |  |
| PP |  |  |  |  |  |  |
| Layer B1 |  |  |  |  |  |  |
| mPE | 60 | 100 |  | 60 |  | 60 |
| PE | 40 |  |  | 40 |  | 40 |
| SEBS |  |  | 100 |  |  |  |
| mSEBS |  |  |  |  | 100 |  |
| PA12 |  |  |  |  |  |  |
| Layer constitution and Layer thickness (mm) | A1 0.5 B1 0.2 A1 1.3 | A1 0.4 B1 0.2 A1 1.4 | A1 1.0 B1 0.2 A1 1.0 | A1 2.5 B1 2.1 A1 2.4 | A1 1.3 B1 0.2 A2 0.5 | A1 0.3 B1 0.1 A1 0.1 |
| Flexural modulus (kg/cm²) |  |  |  |  |  |  |
| A1 | 25000 | 23000 | 24000 | 18000 | 25000 | 35000 |
| B1 | 800 | 800 | 2500 | 800 | 2500 | 800 |
| A2 |  |  |  |  |  |  |
| Ratio |  |  |  |  |  |  |
| (A1/B1) | 31 | 29 | 10 | 23 | 10 | 44 |
| (A2/B1) |  |  |  |  | 10 |  |
| Low-temperature impact strength | ◉ | ◉ | ○ | ◉ | ○ | ◉ |
| Rigidity (kg/cm²) | 22000 | 20000 | 22000 | 12000 | 22000 | 28000 |
| Linear expansion coefficient ($10^{-6} \cdot K^{-1}$) | 10 | 8 | 8 | 9 | 10 | 8 |

TABLE 2

|  | Ex. 7 | Ex. 8 | Comp Ex. 1 | Comp Ex. 2 | Comp Ex. 3 | Comp Ex. 4 |
|---|---|---|---|---|---|---|
| Layer A1 |  |  |  |  |  |  |
| PPE | 40 | 40 | 40 | 40 | 40 | 40 |
| PA6 | 60 | 60 | 60 | 60 | 60 | 60 |
| PC |  |  |  |  |  |  |
| Pst |  |  |  |  |  |  |
| PP |  |  |  |  |  |  |
| SBS | 5 | 5 | 5 | 5 | 5 | 5 |
| mEPR | 5 | 5 | 5 | 5 | 5 | 5 |
| MA | 0.5 | 0.5 | 0.5 | 0.5 | 0.5 | 0.5 |
| Talc | 18 | 18 | 18 | 18 | 18 | 18 |
| Layer A2 |  |  |  |  |  |  |
| PPE |  |  |  |  |  |  |
| PA |  |  |  | 100 |  |  |
| mPA |  |  | 100 |  |  |  |
| Pst |  |  |  |  |  |  |
| PP |  |  |  |  | 100 |  |
| Layer B1 |  |  |  |  |  |  |
| mPE | 80 |  |  |  |  |  |
| PE | 20 |  |  |  |  |  |
| SEBS |  |  |  |  |  |  |
| mSEBS |  |  |  |  |  |  |
| PA12 |  | 100 |  |  |  |  |
| Layer constitution and Layer thickness (mm) | A1 2.5 B1 0.05 A1 2.45 | A1 0.4 B1 0.2 A1 1.4 | A1 0.4 A2 0.2 A1 1.4 | A1 0.4 A2 1.2 A1 0.4 | A1 1.0 A2 0.5 A1 0.5 | A1 2.0 |
| Flexural modulus (kg/cm²) |  |  |  |  |  |  |
| A1 | 35000 | 35000 | 35000 | 35000 | 35000 | 35000 |
| B1 | 800 | 1500 |  |  |  |  |
| A2 |  |  | 8500 | 25000 | 12000 |  |
| Ratio |  |  |  |  |  |  |
| (A1/B1) | 44 | 23 |  |  |  |  |
| (A2/B1) |  |  | 4 | 1.4 | 3 |  |
| Low-temperature impact strength | ○ | ◉ | x | x | xx | xx |
| Rigidity (kg/cm²) | 34000 | 32000 | 32000 | 29000 | 29000 | 35000 |
| Linear expansion coefficient ($10^{-6} \cdot K^{-1}$) | 8 | 8 | 8 | 8 | 10 | 7 |

What is claimed is:

1. A multilayered molding comprising at least two layers A and one layer B, in which the layers A are formed on both sides of the layer B, each layer A comprises a same or different thermoplastic resin compositions, the layer A has a flexural modulus according to ASTM D790 of not less than 5,000 kg/cm², the layer B comprises a thermoplastic resin composition and has a flexural modulus according to ASTM D790 of not more than 5,000 kg/cm², and the ratio of flexural modulus of the layer A to flexural modulus of the layer B is not less than 5.

2. A multilayered molding according to claim 1, wherein the thermoplastic resin composition constituting the layer A comprises at least one thermoplastic resin selected from the group consisting of polyphenylene ethers, polystyrenes, polycarbonates, polybutylene terephthalate, polyamides and polypropylenes.

3. A multilayered molding according to claim 1, wherein the thermoplastic resin composition constituting the layer B comprises at least one thermoplastic resin selected from the group consisting of aromatic vinyl compound-conjugated diene block copolymers, hydrogenation products thereof, ethylene-α-olefin copolymers and modified products thereof.

4. A multilayered molding according to claim 1, wherein the thickness of the multilayered molding is 0.3 to 10 mm.

5. A multilayered molding according to claim 1, wherein the total thickness of the layer A is 50 to 99.5% based on the total thickness of the multilayered molding and the total thickness of the layer B is 0.5 to 50% based on the total thickness of th multilayered molding.

6. A multilayered molding according to claim 1, wherein the layer B has a flexural modulus according to ASTM D790 of less than 2,000 kg/cm².

* * * * *